March 13, 1951     J. L. YOUNG ET AL     2,545,128
BOAT TRAILER
Filed Nov. 15, 1949     2 Sheets-Sheet 1
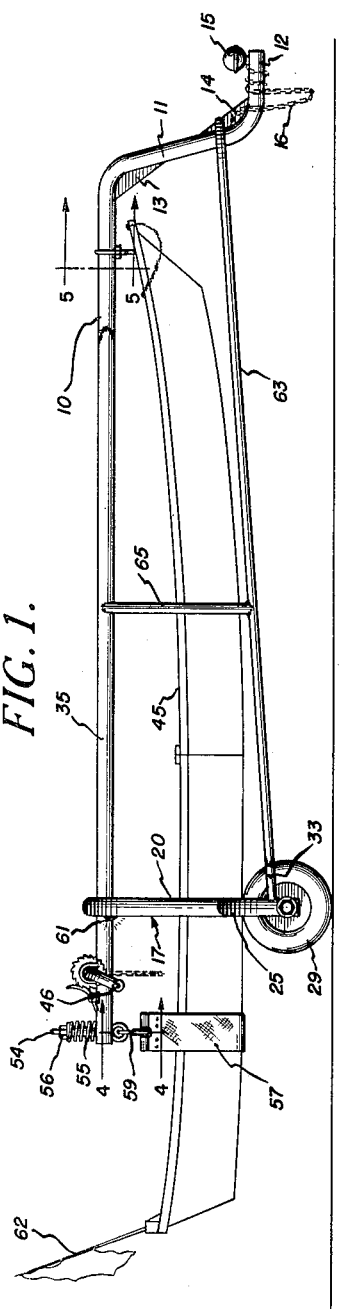
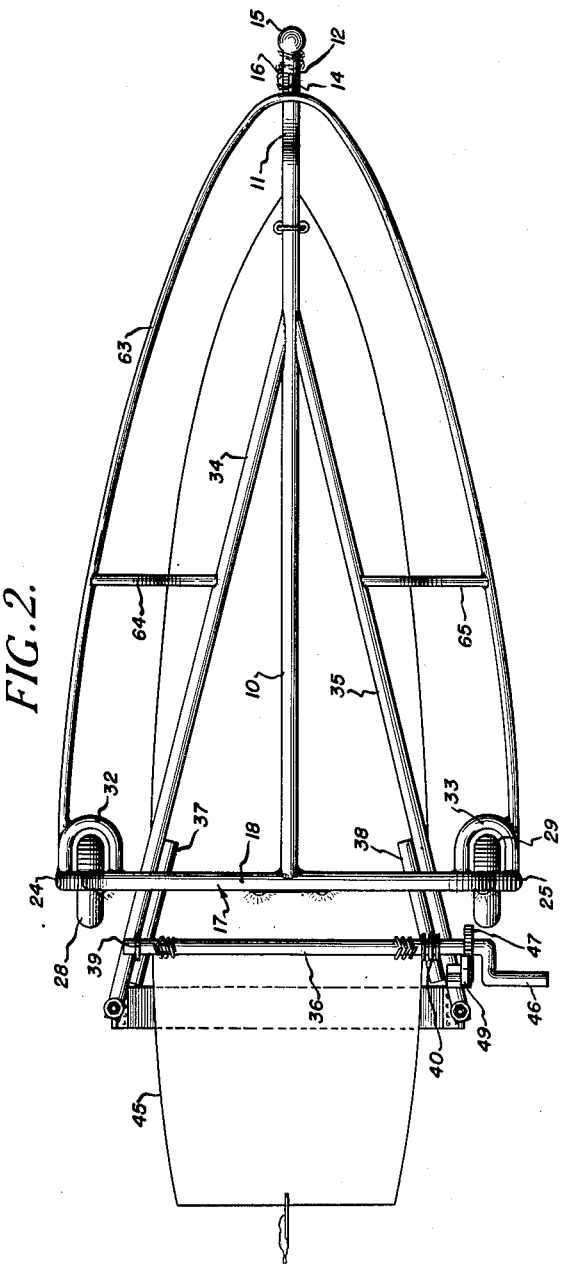
INVENTORS
JOHN L. YOUNG &
VINCENT E. CARLETON
BY
ATTORNEYS

INVENTORS
JOHN L. YOUNG &
BY VINCENT E. CARLETON

ATTORNEYS

Patented Mar. 13, 1951

2,545,128

UNITED STATES PATENT OFFICE 2,545,128

BOAT TRAILER

John L. Young and Vincent E. Carleton, Benton, Ark.

Application November 15, 1949, Serial No. 127,338

4 Claims. (Cl. 214—75)

This invention relates to boat trailers and more particularly to a trailer connectible at one end to a vehicle, such as an automobile, and arranged to suspend a boat therefrom for transportation.

It is among the objects of the invention to provide an improved boat trailer which can be easily connected by a tow hitch to the rear end of an automobile, or similar vehicle, and from which a boat, such as a row boat or small sail boat, can be suspended for transportation, which is simple and durable in construction and can be economically manufactured from readily available stock material, and which is so arranged and constructed that a boat can be easily suspended therefrom without strenuous manual effort and the boat and the wheels of the trailer are effectively protected from damage during transportation of the boat.

Other objects and advantages will become apparent from a consideration of the following description and the appended claims in conjunction with the accompanying drawings, wherein:

Figure 1 is a side elevation of a trailer illustrative of the invention with a boat suspended therein;

Figure 2 is a top plan view of the trailer and boat illustrated in Figure 1;

Figure 3:
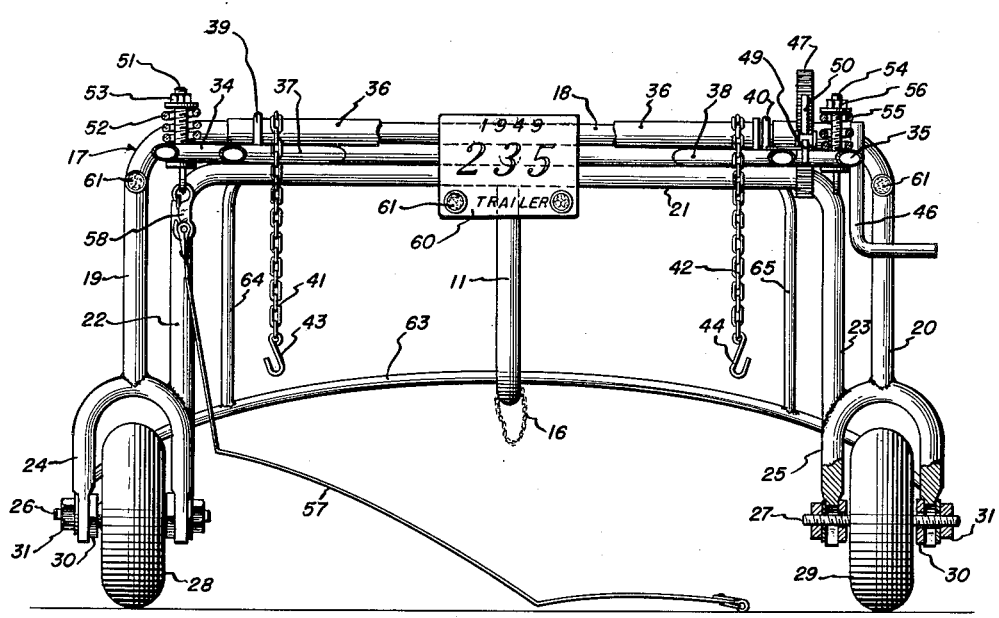
Figure 3 is a rear elevation of the trailer.
Figure 4:
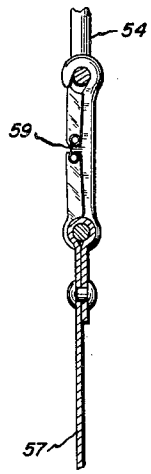
Figure 4 is a cross section of a fragmentary portion of the trailer taken on the line 4—4 of Figure 1 and showing a structural detail.

With continued reference to the drawings, the trailer comprises an elongated tongue 10 which may conveniently be formed of tubular metal stock and has at its front end a downward and somewhat forwardly inclined portion 11 and a forwardly directed portion 12 at the lower end of the downwardly directed portion 11. A web or gusset 13 is secured in the angle between the tongue 10 and the portion 11 and a similar web or gusset 14 is secured in the angle between the portion 11 and the portion 12 to reinforce the bends in the tongue. One element 15 of a trailer or tow hitch is secured to the tongue portion 12 near the forward end of the latter and a light chain 16 is secured to the front end of the tongue, preferably to the web 14 as illustrated, to provide an additional safety hitch for connecting the front end of the trailer to the towing vehicle.

An arched structure, generally indicated at 17 is secured at its mid-length location to the rear end of the tongue 10 and extends below the tongue in substantially perpendicular relationship to the latter. This arched structure comprises an outer tube of bracket-shaped formation having a straight intermediate portion 18 which is welded or otherwise suitably secured at its mid-length location to the rear end of the tongue 10 and two legs 19 and 20 at the respectively opposite ends of the intermediate portion 18 and disposed substantially perpendicular to the latter, the two legs being joined to the intermediate portion by arcuately curved bends as is clearly illustrated in Figure 3. The arched structure further comprises an inner, bracket-shaped tubular member having an intermediate portion 21 disposed below and substantially parallel to the intermediate portion 18 of the outer member, and two legs 22 and 23 disposed within and substantially parallel to the legs 19 and 20 of the outer member respectively.

An inverted U-shaped fork 24 is secured at its mid-length location to the lower end of the leg 19 of the outer member of the structure 17 and projects downwardly from such leg substantially in vertical alignment therewith and a similar U-shaped fork or yoke 25 is secured at its mid-length location to the lower end of the leg 20 and projects downwardly therefrom in substantially vertical alignment therewith. The leg 22 of the inner member of the arched structure is secured at its lower end to the fork 24 at the inner side of the fork and the leg 23 of the inner member is similarly secured to the fork 25.

The legs of the forks 24 and 25 are flattened at their lower ends and provided with deep notches and the notches in the lower ends of the fork 24 receive an axle 26 while the notches in the lower ends of the fork 25 receive a similar axle 27. A wheel 28 is disposed within the fork 24 and is journaled on the axle 26 while a wheel 29 is disposed within the fork 25 and journaled on the axle 27. The axles are secured to the forks by inner and outer clamp nuts, as indicated at 30 and 31 threaded onto the externally screw threaded end portions of the axles.

The fork 24 further includes a U-shaped fender 32 which extends forwardly from the lower end of the fork 24 substantially perpendicular to the latter and has its ends secured to the legs of the fork 24 near the lower ends of such legs. The fork 25 includes a similar fender 33, the legs of which are secured to the legs of the fork 25 near the lower ends of the fork legs so that the fender projects forwardly of the fork substantially perpendicular thereto.

The rear end of the tongue 10 is received between the intermediate portions 18 and 21 of the two members of the arched structure and two diagonal braces 34 and 35 disposed at respectively opposite sides of the tongue 10 are secured at their forward ends to the tongue at a location on the latter adjacent the downwardly bent portion 11 and these braces diverge symmetrically rearwardly and extend through the space between the intermediate portions 18 and 21 near the respectively opposite ends of the arched structure. These braces extend rearwardly of the arched structure 17 and a roller shaft 36 is journaled near its respectively opposite ends on the braces 34 and 35 rearwardly of the arched structure 17, this roller being spaced rearwardly from and substantially parallel to the intermediate portion 18 of the outer member of the arched structure.

Short tube sections 37 and 38 are secured to the inner sides of the braces 34 and 35 respectively rearwardly of the arched structure 17 and an eye 39 secured to and upstanding from the brace 34 and the tubular section 37 rotatably receives the adjacent end of the roller 18 while a similar eye 40 secured to and upstanding from the brace 35 and the tube section 38 journals the roller 18 near its opposite end. Chains 41 and 42 are wound on the roller 18 near the respectively opposite ends of the roller and depend from the roller. At their lower ends these chains carry hooks 43 and 44 respectively which are engageable with the structure of a boat, such as the boat 45 illustrated in Figures 1 and 2, for raising the boat upwardly into the arched structure 17. A hand crank 46 is secured to one end of the roller 18 for rotating the latter and a ratchet wheel 47 is secured on the roller adjacent the crank. A plate 49 is secured on the top of the brace 35 and a pawl 50 carried by this plate engages the ratchet wheel 47 to hold the roller 36 against rotation in a direction to lower the boat. The pawl may be manually released from the ratchet wheel when it is desired to lower the boat and remove it from the trailer.

Rearwardly of the roller 36 the brace 34 is provided with a substantially vertically extending aperture and an eye bolt 51 is slidably mounted in this aperture with its eye below the brace. A compression spring 52 surrounds the bolt above the brace 34 and bears at its lower end on the brace and at its upper end against a nut 53 threaded onto the eye bolt. The brace 35 is provided with a similar aperture rearwardly of the roller 36 and an eye bolt 54 is slidably mounted in this aperture with its eye disposed below the brace 35. A compression spring 55 surrounds the bolt above the brace 35 and bears at its lower end on the brace and at its upper end against a nut 56 threaded onto the bolt.

A flexible band 57 formed of webbing, belting or suitable material has a hem provided at each end and has a metal rod or bar extending through each hem. The hems are apertured and a double hook 58 secures one end of the band 57 to the eye of the bolt 51 while a similar double hook 59 secures the opposite end of the band to the eye of the bolt 54.

After the bolt has been raised to proper position by the chains 41 and 42 the band 57 is placed beneath the boat and secured at its ends to the eye bolts 51 and 54. The pawl 50 is then released from the ratchet wheel 47 and the roller 36 permitted to rotate to allow the boat to settle on the band 57. The hooks 43 and 44 may then be disengaged from the boat and the boat supported entirely by the band 57, the springs 52 and 55 providing a resilient support for the boat on the rear end of the trailer.

A trailer license plate 60 may be conveniently secured to the rear side of the upper portion of the arched structure 17 and reflector buttons 61 may be secured to the rear side of the arched structure and to the license plate to provide warning signals at the rear end of the trailer. A further warning signal may be provided by mounting a red flag 62 on the rear end of a boat carried by the trailer.

A U-shaped guard rail 63 is secured substantially at its mid-length position to the downwardly extending portion 11 of the tongue 10 near the lower end of such portion and the legs of this guard rail extend rearwardly at respectively opposite sides of the tongue and are secured at their rear ends to the outer sides of the fenders 32 and 33 respectively as is particularly illustrated in Figure 2.

Curved braces 64 and 65 extend from the diagonal braces 34 and 35 respectively to the adjacent legs of the guard rail 33 intermediate the length of the latter and are disposed substantially perpendicular to the guard rail legs.

Figure 5:
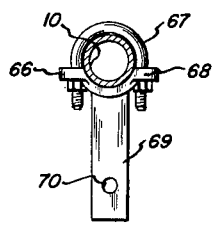
Figure 5 is a transverse cross section on an enlarged scale on the line 5—5 of Figure 1.
Figure 7:
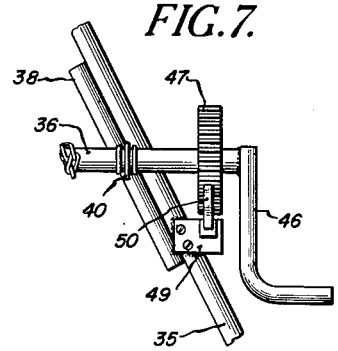
Figure 7 is a top plan view of a fragmentary portion of the trailer as illustrated in Figure 2 showing a structural detail.
Figure 6:
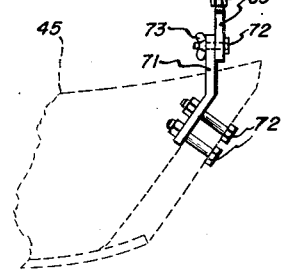
Figure 6 is a side elevation of the structure shown in Figure 5 and illustrates the mechanism for attaching one end of the boat to the trailer.

A T-shaped member 66, as particularly illustrated in Figures 5 and 6, is secured to the tongue 10 near the downwardly bent portion 11 by a U bolt 67 which partly surrounds the stem and extends at its ends through apertures provided in the saddle 68 of the member 66 near the respectively opposite ends of the saddle, nuts being threaded onto the ends of the U bolt to firmly secure the member 66 to the tongue. A tab 69 extends downwardly from the saddle 68 of the member 66 and is provided near its lower end with an aperture 70. A bracket 71 is secured to the bow end of the boat 45 by suitable means such as the bolts 72 and this bracket projects upwardly above the boat and is provided near its upper end with an aperture.

In securing the bow end of the boat to the trailer, after the trailer has been positioned over the boat, the front end of the trailer is lowered until the aperture 70 in the tab 69 registers with the aperture near the upper end of the bracket 71 and a bolt 72 is then inserted through these registering apertures and a wing nut 73 is threaded onto the bolt.

After the bow end of the boat has been secured to the trailer tongue by the member 66, bracket 71 and bolt 72, the hooks 43 and 44 are engaged with the boat structure and the boat raised up into the arched structure 17 near the rear end of the trailer by turning the hand crank 46, the band 57 is then secured in place beneath the boat, the chains 41 and 42 slacked and the hooks 43 and 44 removed, in the manner indicated above, and the boat is then properly suspended for transportation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A boat trailer comprising an elongated tongue having a downwardly extending portion at its forward end, a hitch element secured to said tongue at the end of said downwardly extending portion, an arched structure of a size to receive a boat therein secured substantially at its mid-length location to the rear end of said tongue and disposed substantially perpendicular to the latter, an inverted U-shaped fork secured to each end of said arched structure, a wheel journaled in each fork, two diagonal braces disposed at respectively opposite sides of said tongue and connected at their front ends to said tongue near the downwardly extending portion of the latter and intermediate their length to said arched structure near respectively opposite ends of such structure, said braces extending rearwardly of said arched structure, a roller journaled on said braces rearwardly of said arched structure, flexible means depending from said roller and windable thereon for lifting a boat into said arched structure, a flexible band disposable below a boat in said arched structure, spring supported means carried respectively by said braces rearwardly of said roller and engageable with said band at the respectively opposite ends of the latter to support a boat in said arched structure, a U-shaped guard rail secured substantially at its mid-length location to said tongue adjacent said hitch element and at its ends respectively to said forks at the outer sides of the latter, a curved brace extending from each diagonal brace to the adjacent side of said guard rail, and means carried by said tongue near said downwardly extending portion for attaching an end of a boat to said tongue.

2. A boat trailer comprising an elongated tongue having a downwardly extending portion at its forward end, a hitch element secured to said tongue at the end of said downwardly extending portion, an arched structure of a size to receive a boat therein secured substantially at its mid-length location to the rear end of said tongue and disposed substantially perpendicular to the latter, an inverted U-shaped fork secured to each end of said arched structure, a wheel journaled in each fork, two diagonal braces disposed at respectively opposite sides of said tongue and connected at their front ends to said tongue near the downwardly extending portion of the latter and intermediate their length to said arched structure near respectively opposite ends of such structure, said braces extending rearwardly of said arched structure, a roller journaled on said braces rearwardly of said arched structure, flexible means depending from said roller and windable thereon for lifting a boat into said arched structure, a flexible band disposable below a boat in said arched structure, spring supported means carried respectively by said braces rearwardly of said roller and engageable with said band at the respectively opposite ends of the latter to support a boat in said arched structure, a U-shaped guard rail secured substantially at its mid-length location to said tongue adjacent said hitch element and at its ends respectively to said forks at the outer sides of the latter, a curved brace extending from each diagonal brace to the adjacent side of said guard rail, means carried by said tongue near said downwardly extending portion for attaching an end of a boat to said tongue, said arched structure comprising an outer bracket shaped member and an inner bracket shaped member, said members having spaced apart legs and intermediate portions substantially parallel to each other, and said tongue and said diagonal braces being secured between the intermediate portions of said bracket shaped members.

3. A boat trailer comprising an elongated tongue having a downwardly extending portion at its forward end, a hitch element secured to said tongue at the end of said downwardly extending portion, an arched structure of a size to receive a boat therein secured substantially at its mid-length location to the rear end of said tongue and disposed substantially perpendicular to the latter, an inverted U-shaped fork secured to each end of said arched structure, a wheel journaled in each fork, two diagonal braces disposed at respectively opposite sides of said tongue and connected at their front ends to said tongue near the downwardly extending portion of the latter and intermediate their length to said arched structure near respectively opposite ends of such structure, said braces extending rearwardly of said arched structure, a roller journaled on said braces rearwardly of said arched structure, flexible means depending from said roller and windable thereon for lifting a boat into said arched structure, a flexible band disposable below a boat in said arched structure, spring mounted anchoring means carried respectively by said braces rearwardly of said roller and engageable with the opposite ends of the band to connect the band to the braces for underlying and supporting a boat, a U-shaped guard rail secured substantially at its mid-length location to said tongue adjacent said hitch element and at its ends respectively to said forks at the outer sides of the latter, a curved brace extending from each diagonal brace to the adjacent side of said guard rail, means carried by said tongue near said downwardly extending portion for attaching an end of a boat to said tongue, each of said forks including an inverted U-shaped portion having its legs flattened at their lower ends and notched to receive a wheel carrying axle, and a U-shaped fender secured at its ends to the legs of said fork near the lower ends of the fork legs and extending forwardly of said fork substantially perpendicular thereto.

4. A boat trailer comprising an elongated tongue having a forward end, a hitch element secured to said tongue at the forward end thereof, an arched structure secured substantially at its mid-length location to the rear end of said tongue and disposed substantially perpendicular to the latter, wheel forks secured to said structure one at each end thereof, a wheel journaled in each fork, diagonal braces disposed at respectively opposite sides of said tongue and secured at their forward ends to said tongue near said downwardly extending portion, said braces diverging rearwardly from said tongue and extending to the rear of said arched structure, boat supporting means carried by said tongue near said downwardly extending portion of the latter and boat supporting means resiliently mounted on said braces, said last means including a pair of spring mounted bolt elements, a flexible band disposable below a boat in said arched structure, means connecting the opposing ends of said band to the bolt elements.

JNO. L. YOUNG.
VINCENT E. CARLETON.

REFERENCES CITED

The following references are of record in the file of this patent:

UNITED STATES PATENTS

| Number | Name | Date |
|---|---|---|
| 2,260,676 | Lafaye, Sr. | Oct. 28, 1941 |
| 2,425,252 | Larson | Aug. 5, 1947 |
| 2,427,667 | Gilbert | Sept. 23, 1947 |
| 2,448,119 | Peterson | Aug. 31, 1948 |
| 2,452,937 | Krake | Nov. 2, 1948 |
| 2,478,424 | Reid | Aug. 9, 1949 |
| 2,498,014 | Spencer, Jr., et al. | Feb. 21, 1950 |